INVENTORS
ROGER C. EMANUELSON
WARREN L. LUOMA
BY Edmund C. Meisinger
ATTORNEY

PARTICLE SIZE DISTRIBUTION LIMITS FOR GRAPHITE POWDER 3,634,569
Patented Jan. 11, 1972

1

3,634,569

METHOD OF MANUFACTURE OF DENSE GRAPHITE STRUCTURES

Roger C. Emanuelson, Glastonbury, and Warren L. Luoma, East Hartford, Conn., assignors to United Aircraft Corporation, East Hartford, Conn.

Filed Jan. 8, 1969, Ser. No. 789,780
Int. Cl. H01m *13/04*
U.S. Cl. 264—105 9 Claims

ABSTRACT OF THE DISCLOSURE

This disclosure describes a graphite composition and a fabrication procedure for producing coolant and/or support plates for acid fuel cells. The composition consists of a graphite powder sized principally in the 50 to 150-micron range with about 7 percent of the graphite powder in the range below 50 microns. The process involves a controlled low-pressure heating step and an intermediate temperature full-pressure molding operation. Homogeneous graphite structures of high density with improved structural, thermal, and electrical properties can be provided in a variety of extremely intricate shapes by molding.

BACKGROUND OF THE INVENTION

This invention relates to dense graphite structures and the method for fabricating such structures. In particular, this invention relates to molding dense graphite plates having complicated shapes for use in acid fuel cells.

The preparation of graphite structures using powder metallurgy techniques and any of a number of commercially available grades of carbon or graphite powders is known. Carbon or graphite bodies have been proposed and utilized in acid fuel cells but generally as porous bodies. It is known to provide carbon bodies from a fine powder of carbonaceous material with or without binders.

Graphite structures for use in acid electrolyte fuel cells have previously been machined from graphite blanks to the desired configuration. Experience has shown that this method is very expensive and the structural configurations are limited because of machining requirements. Further, problems are encountered in obtaining homogeneous structures which are impervious to gases and the acid electrolyte.

In acid fuel cells, graphite structures have been used to form part of the gas chambers for containing the fuel and oxidant in close spaced relationship with the cell electrodes. Acid cells and graphite plates are more completely described in a copending application of Dews et al. having U.S. Ser. No. 789,777 and a filing date of Jan. 8, 1969 and assigned to the assignee of the present invention. Gas leakage impares cell efficiency. It has been found that these structures should have a density of 1.8 g./cc. or better to insure that the structure is impervious to hydrogen or other gases. These structures support the elctrodes and direct the gas flow and are often used to form part of the electrical circuitry in a plurality of single cells. Heat management can be controlled by conducting heat through these structures to external fins or to a coolant. A unique combination of properties is required of an acid cell component.

To produce an economical and practical fuel cell system, emphasis has been placed on improving known cell components to provide similar improvements in cost, performance, and life of the fuel cell. Thus, improved structures and fabricating techniques are essential in the production of a better product in a competitive market. In addition, graphite structures which are characterized by high strength, high conductivities, and high density should have many useful applications.

2

SUMMARY OF THE INVENTION

It is an object of this invention to provide a dense, conductive graphite structure and to provide a method of fabricating such a structure.

Another object of this invention is the production of a high density, homogeneous graphite body with improved structural, thermal, and electrical properties for use in acid fuel cells.

A further object of this invention is the method of producing coolant or separator plates for acid electrolyte fuel cells. Another aspect of this invention is the ability to mold thin graphite plates having complicated shapes in a simple operation.

It has now been found that the foregoing and related objects and advantages may be readily attained through the use of the method disclosed. In accordance with my invention, a method of forming a high density graphite structure comprises preparing a mixture of, by weight, 5 to 25 percent thermosetting phenolic resin binder and 75 to 95 percent sized powdered graphite, by mixing the resin binder with a liquid dispersant, blending the powdered graphite with the resin binder and dispersant to form a slurry, drying the slurry to drive off the dispersant, distributing a predetermined quantity of the graphite and binder mixture in a mold, applying less than bout 100 p.s.i. pressure to the mold while heating the mold and contents to about 200° F., applying a full pressure of about 3000 p.s.i. when the temperature reaches the selected value of approximately 200° F., heating the mold and contents to a temperature of 300–400° F., and cooling the mold and contents while full pressure is maintained. While commercially available powders produce an improved product, it has been observed that a structure with superior properties is obtained through the use of graphite powders selected so that the maximum particle size does not exceed 300 microns, and the particle distribution is selected in accordance with the limits specified in Table I hereinafter described.

Other objects and advantages of the present invention will become more apparent from the following detailed description of a preferred embodiment thereof and from the accompanying drawings.

DESCRIPTION OF THE PREFERRED EMBODIMENT

Figure 1:
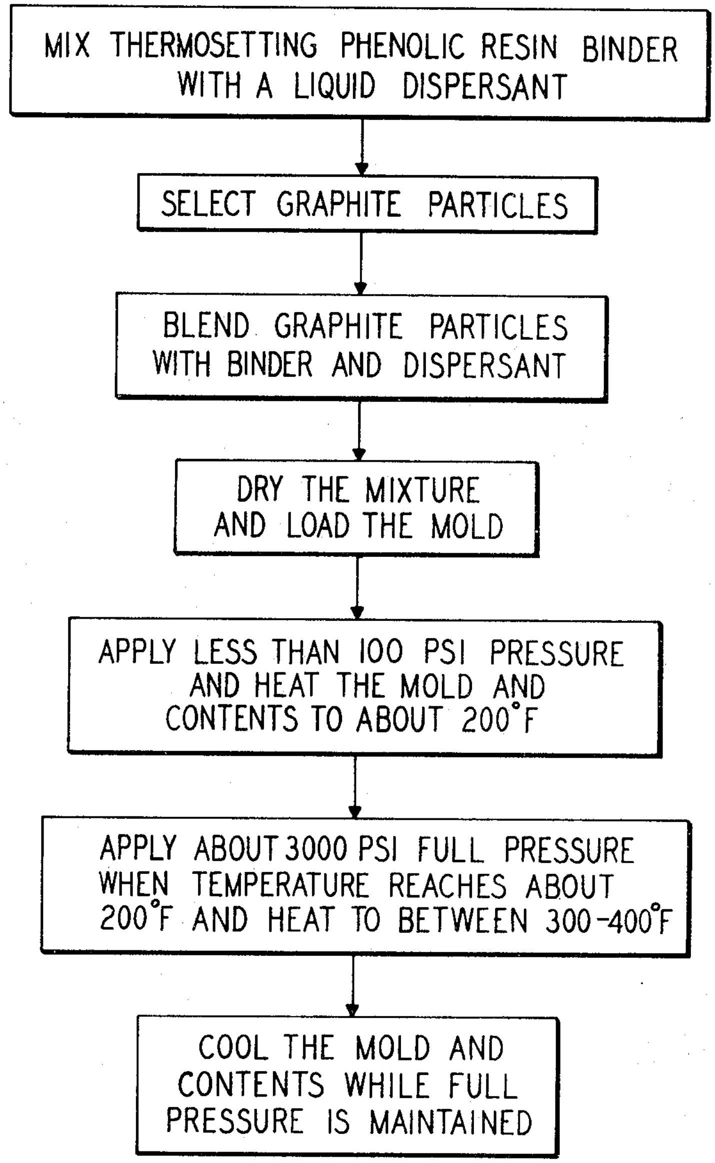
FIG. 1 is a block diagram of a method of forming a high density graphite structure embodying my invention.

A method of forming a high density conductive graphite structure is shown in FIG. 1. The invention contemplates the use of powder metallurgy techniques and comprises a novel process utilizing an improved graphite particle distribution. Using this process, we have discovered that graphite structures of superior strength, density, and conductivity can be molded in very intricate patterns and channels suitable for use in acid electrolyte fuel cells as support structures and coolant plates.

In accordance with this invention, a thermosetting phenolic resin binder is mixed with a vaporizable liquid dispersant to insure uniform distribution of the binder. A particularly suitable thermosetting phenolic resin binder is Resinox Phenolic RS 7163, available from the Monsanto Company and a suitable vaporizable liquid dispersant is isopropyl alcohol. The preparation of the composition involves mixing a slurry by blending the graphite powders into the resin binder and dispersant and drying the mixture to drive off the dispersant.

The preferred composition range extends from about 75 to 95 weight percent of graphite powder and about 5 to 25 weight percent of resin binder. It has also been discovered that a distribution of particle sizes as shown in Table I is important in producing graphite structures with densities as high as 2.0 g./cc.

TABLE I.—PARTICLE WEIGHT DISTRIBUTION

| Particle size distribution | Percent: Broad range | Percent: Preferred range | Percent: Optimum |
|---|---|---|---|
| Microns: | | | |
| 80–160 | 37–76 | 46–66 | 56 |
| 60–100 | 20–74 | 35–60 | 47 |
| 50–80 | 10–48 | 20–40 | 30 |
| 40–60 | 3–23 | 8–18 | 13 |
| Fines—Below 50 microns | 1–12 | 3–12 | 7 |

Figure 2:
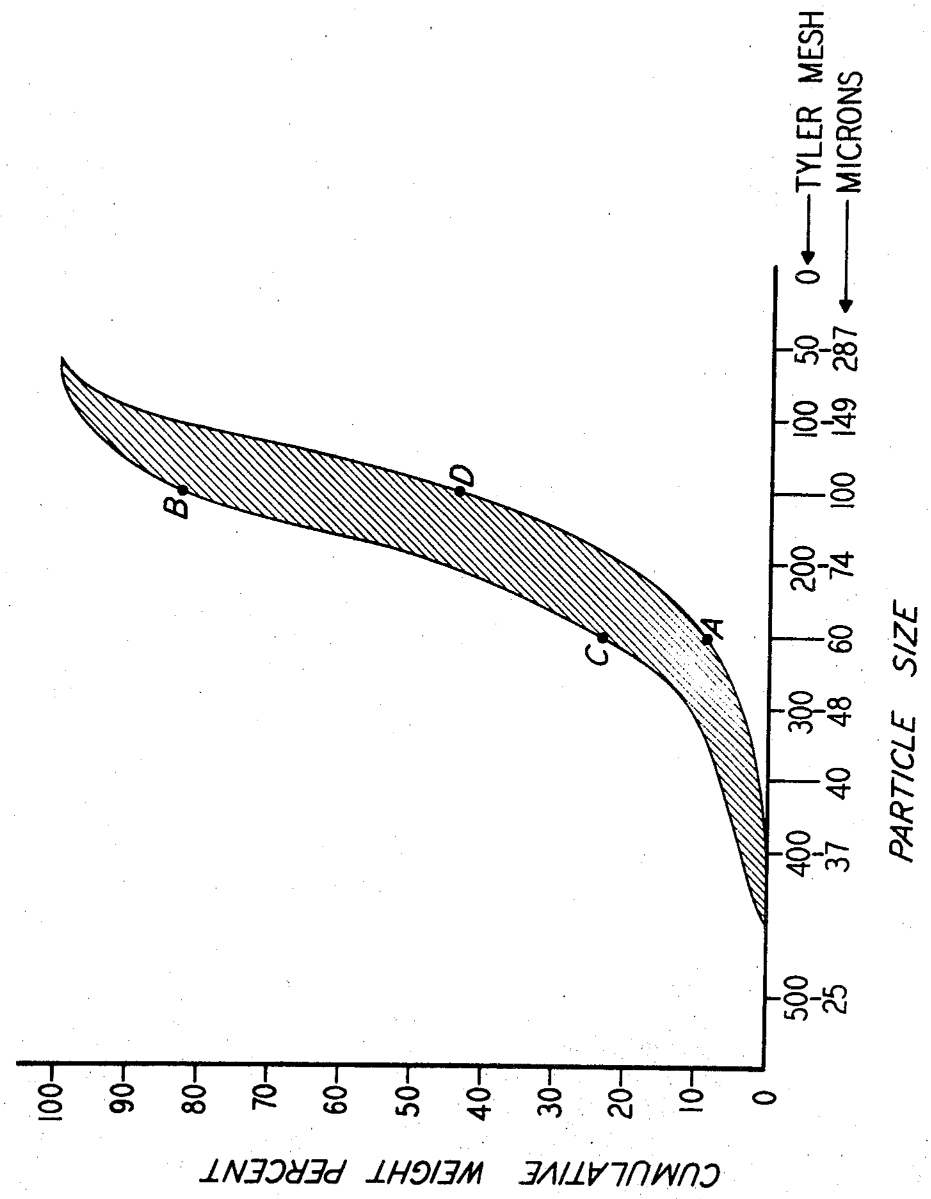
FIG. 2 is a graphical presentation of the graphite powder particle size distribution limits.

The shaded band on FIG. 2 forms the basis for selecting the particle sizes, distribution and ranges. The particle weight distribution percentages tabulated represent the differences in cumulative weight percents which occur for the selected particle size range. For example, the weight percent at point B less the weight percent at A is 74% and represents the largest weight variation which might occur in the 60–100-micron range. The lowest variation of 20% is the difference in weight percent between points C and D. The preferred range for 60–100 microns is determined by the weight differences along the boundary of the band; i.e., the weight percent at point D less point A, which is 35, and the weight percent at point B less point C, which is 60. The optimum distribution is midway in the preferred range. No particle size should be greater than 300 microns and about 3–12 weight percent fine particles are necessary in achieving the desired structure.

After the slurry has been dried to drive off the dispersant, the powder may be screened to break up any agglomerates. Prior to loading the mold cavity with the graphite-resin powder composition, the mold surfaces are coated with a release agent to facilitate removal of the pressed structure. The mold is then loaded with a predetermined amount of powder to obtain the desired density and desired final thickness. Proper loading of the mold is important to insure uniformly dense and flaw-free structures.

After the powder composition is loaded in the mold, a light pressure of less than about 100 p.s.i. is applied to the mold plungers while the mold and contents are heated to about 200° F. Preheating of the mold and contents prior to loading into a press is within the intended scope of the process. A nominal hold time at 200° F., less than about 5 minutes for example, is satisfactory. The 200° F. temperature appears to be the maximum temperature allowable before the resin curing starts to occur. Application of the low-pressure facilitates the escape of volatiles from the mold and contents. When the temperature reaches about 200° F., a full pressure of about 3000 p.s.i. is applied. Heating is continued to between 300–400° F. and thereafter the mold and contents are cooled while the full pressure is maintained. After the structures are removed from the mold, they may be post-cured above the use temperature at around 325–400° F. for approximately 6 hours to remove residual stresses.

Although the preferred process steps have been enumerated, certain temperature and pressure modifications may be made without sacrificing the product characteristics. For example, the initial pressing step may be carried out at pressures as low as a few p.s.i. while the temperature range associated with this step may vary from 180 to 220° F. The second step in the process may be carried out at temperatures between 300 and 400° F. and at full pressures between 2500 to 3500 p.s.i. although about 3000 p.s.i. is preferred. Hold periods depend upon the rate of heating and the thickness of the structure and need only be sufficient to permit the entire mass to uniformly attain the proper temperature.

In order to demonstrate the advantage of the present invention, a number of structures were fabricated in accordance with the described method and were compared to structures fabricated by the normal techniques.

EXAMPLE I

An 80 percent graphite powder and 20 percent resin binder structure was constructed by blending the graphite powder into a mixture of a Resinox-Phenolic resin binder RS 1763 from the Monsanto Company and an isopropyl alcohol dispersant. The graphite particles were selected in accordance with the distribution as shown in FIG. 2. The slurry was dried to drive off the dispersant and loaded uniformly into a mold for pressing a complex graphite structure. A pressure of 100 p.s.i. was applied and the mold and contents were heated to about 200° F. Thereafter, 3000 p.s.i. was applied and the temperature was raised to 385° F. The mold and contents were cooled while full pressure was maintained. The structure was post-cured and resulted in a plate with characteristics tabulated in column 1 of Table II.

EXAMPLE II

This same process was applied to a mixture of 80 percent graphite powder and 20 percent binder. The difference was that the powder was not selected in accordance with the schedule on FIG. 2. The mixture was the commercially available graphite powder and proprietary binder mixture designated as MG–2 available from the Carborundum Company. After post-curing, this plate had characteristics shown in column 2 of Table II.

EXAMPLE III

A graphite structure using the commercially available MG–2 graphite and binder mixture and the conventional pressing process demonstrate properties as shown in column 3 of Table II. The process consists essentially of pressing at a few hundred p.s.i. and heating to 300° F. followed by a pressing operation at around 3000 p.s.i. with molding temperatures around 400° F.

TABLE II

| | Example I | Example II | Example III |
|---|---|---|---|
| Density (g./cc.) | 2.0 | 1.85 | 1.89 |
| Compressive strength (lb./in.²) | 15–17,000 | 17,000 | 12,000 |
| Electrical resistivity (ohms-cm.) | $4.3\times10^{-3}$ | $11\times10^{-3}$ | -------- |
| Thermal conductivity (B.t.u./hr./ft./° F.): | | | |
| Direction perpendicular to pressing | 32.5 | 18 | -------- |
| Direction parallel to pressing | 17 | 9 | -------- |

Table II demonstrates that the process described and the selection of powders as disclosed in our invention achieves a superior graphite structure. Further, the process alone provides an improved structure and improved conductivities. Homogeneous structures which are impervious to gases and acid electrolyte can thus be molded into thin structures having extremely intricate shapes in a simple operation. Further, structures fabricated through the use of this process and powder distribution have particular utility in the acid fuel cell program due to the unique combination of properties that result from such a structure.

Although the invention has been shown and described with respect to a preferred embodiment, it should be understood by those skilled in the art that various changes and omissions in the form and detail may be made therein without departing from the spirit and the scope of the invention.

We claim:

1. The method of fabricating dense graphite structures by powder metallurgy techniques comprising:

mixing a thermosetting phenolic resin binder with a vaporizable liquid dispersant;

blending powdered graphite thereinto in the proportion, by weight, of 75 to 95 percent graphite and 5 to 25 percent binder to form a slurry;

drying the slurry to drive off the dispersant;

distributing a predetermined amount of the graphite-binder mixture in a mold;

applying a pressure of less than about 100 p.s.i. to the mold while heating the mold and contents to a temperature between 180 to 220° F.;

applying a full pressure of 2500 to 3500 p.s.i. when the temperature reaches the selected value between 180 to 220° F. and heating the mold and contents to a temperature between 300 and 400° F.; and cooling the mold and contents to a temperature below 300° F. while full pressure is maintained.

2. The method of claim 1, including the additional step of:

post-curing the structure at about 325° F. to 400° F. for approximately 6 hours to remove residual stresses.

3. The method of fabricating dense graphite structures by powder metallurgy techniques comprising:

mixing a thermosetting phenolic resin binder with a vaporizable dispersant;

selecting graphite powder such that:

(a) the maximum particle size does not exceed 300 microns, (b) 37–76 percent of the particles are in the 80 to 160-micron range, (c) 20–74 percent of the particles are in the 60 to 100-micron range, (d) 10–48 percent of the particles are in the 50 to 80-micron range, (e) 3–23 percent of the particles are in the 40 to 60-micron range, and (f) 1–12 percent of the particles are less than 50 microns;

blending the powdered graphite thereinto in the proportion, by weight, of 75 to 95 percent graphite and 5 to 25 percent binder to form a slurry;

drying the slurry to drive off the dispersant;

distributing a predetermined amount of the graphite-binder mixture in a mold;

applying a pressure of less than about 100 p.s.i. to the mold while heating the mold and contents to a temperature between 180 to 220° F.;

applying a full pressure of 2500 to 3500 p.s.i. when the temperature reaches a selected value between 180 to 220° F. and heating the mold and contents to a temperature between 300 and 400° F.; and cooling the mold and contents to a temperature below 300° F. while full pressure is maintained.

4. The method of claim 3 wherein the graphite powder is selected so that:

(a) the maximum particle size does not exceed 300 microns, (b) 46–66 percent of the particles are in the 80 to 160-micron range, (c) 35–60 percent of the particles are in the 60 to 100-micron range, (d) 20–40 percent of the particles are in the 50 to 80-micron range.

(e) 8–18 percent of the particles are in the 40 to 60-micron range, and (f) 3–12 percent of the particles are less than 50 microns.

5. In the powder metallurgy method of molding a dense graphite-resin structure wherein a mixture in the proportion. by weight, of 75 to 95 percent of graphite powder and 5 to 25 percent thermosetting phenolic resin binder is heated and simultaneously pressed, the improvement which comprises:

applying a pressure of less than about 100 p.s.i. to the mold while the mold and contents are heated to about 200° F.; and applying a full pressure of about 3000 p.s.i. when the temperature reaches about 200° F. and heating to about 300–400° F.

6. The method of claim 5 including the step of selecting the graphite powder such that:

(a) the maximum particle size does not exceed 300 microns, (b) 46–66 percent of the particles are in the 80 to 160-micron range, (c) 35–60 percent of the particles are in the 60 to 100-micron range, (d) 20–40 percent of the particles are in the 50 to 80-micron range, (e) 8–18 percent of the particles are in the 40 to 60-micron range, and (f) 3–12 percent of the particles are less than 50 microns.

7. The method of fabricating dense graphite coolant plates for use in acid electrolyte fuel cells by powder metallurgy techniques comprising:

mixing a thermosetting phenolic resin binder with a vaporizable liquid dispersant;

selecting graphite powder such that:

(a) the maximum particle size does not exceed 300 microns, (b) 37–76 percent of the particles are in the 80 to 160-micron range, (c) 20–74 percent of the particles are in the 60 to 100-micron range, (d) 10–48 percent of the particles are in the 50 to 80-micron range, (e) 3–23 percent of the particles are in the 40 to 60-micron range, and (f) 1–12 percent of the particles are less than 50 microns;

blending powdered graphite thereinto in the proportion, by weight, of 75 to 95 percent graphite and 5 to 25 percent binder to form a slurry;

drying the slurry to drive off the dispersant;

distributing a predetermined amount of the graphite-binder mixture in a mold;

applying a pressure less than about 100 p.s.i. to the mold while heating the mold and contents to a temperature between 180 to 220° F.;

applying a full pressure of 2500 to 3500 p.s.i. when the temperature reaches the selected value between 180 to 220° F. and heating the mold and contents to a temperature between 300 and 400° F.; and cooling the mold and contents to a temperature below 300° F. while full pressure is maintained.

8. In the powder metallurgy method of molding dense graphite members for use in acid electrolyte fuel cells wherein a mixture in the proportion, by weight, of 75 to 95 percent of graphite powder and 5 to 25 percent thermosetting phenolic resin binder is heated and simultaneously pressed, the improvement which comprises:

applying a pressure less than about 100 p.s.i. to the mold while the mold and contents are heated to about 200° F.;

applying a full pressure of about 3000 p.s.i. when the temperature reaches about 200° F. and heating to about 300–400° F.;

cooling the mold and contents to a temperature below 300° F. while the full pressure is maintained.

9. The method of claim 8 wherein the graphite particles are selected so that:

(a) the maximum particle size does not exceed 300 microns, (b) 46–66 percent of the particles are in the 80 to 160-micron range, (c) 35–60 percent of the particles are in the 60 to 100-micron range, (d) 20–40 percent of the particles are in the 50 to 80-micron range, (e) 8–18 percent of the particles are in the 40 to 60-micron range, and (f) 3–12 percent of the particles are less than 50 microns.

References Cited

UNITED STATES PATENTS

| | | | |
|---|---|---|---|
| 3,084,394 | 4/1963 | Bickerdike | 264—105 |
| 3,252,839 | 5/1966 | Langer et al. | 136—122 |
| 3,306,779 | 2/1967 | Flannery et al. | 136—122 |
| 3,457,113 | 7/1969 | Deibert | 136—122 |

ROBERT F. WHITE, Primary Examiner

G. AUVILLE, Assistant Examiner

U. S. Cl. X.R.

136—122; 264—331